United States Patent [19]

Conner

[11] Patent Number: 4,620,187

[45] Date of Patent: Oct. 28, 1986

[54] TRANSFORMER COUPLED, SOLID STATE COMMUNICATIONS LINE SWITCH

[75] Inventor: David E. Conner, Cary, N.C.

[73] Assignee: International Business Machines Corp., Armonk, N.Y.

[21] Appl. No.: 680,621

[22] Filed: Dec. 11, 1984

[51] Int. Cl.$^4$ .......................... H04Q 3/00; H04J 3/02; H04J 3/00; H04B 3/00

[52] U.S. Cl. ................. 340/825.05; 370/85; 370/117; 375/36

[58] Field of Search ...................... 340/825.05; 370/56, 370/85, 86, 117; 178/64; 375/3, 36; 307/17, 415, 417

[56] References Cited

U.S. PATENT DOCUMENTS

| | | | |
|---|---|---|---|
| 2,978,592 | 4/1961 | Kilburn et al. ................. | 307/415 |
| 3,328,527 | 6/1967 | Miles ................................ | 375/36 |
| 3,458,665 | 7/1969 | Markey ............................ | 375/36 |
| 3,597,733 | 8/1971 | Foxwell .......................... | 375/36 |
| 4,388,716 | 6/1983 | Takezoe et al. ................. | 375/36 |
| 4,528,677 | 7/1985 | Ise et al. ......................... | 375/36 |

*Primary Examiner*—Ulysses Weldon
*Assistant Examiner*—Ralph Smith
*Attorney, Agent, or Firm*—Joscelyn G. Cockburn

[57] ABSTRACT

A plurality of signal coupling transformers and a plurality of solid state switches are used to insert and/or de-insert data terminal equipment (DTE) from a communications network. The solid state switches are controlled to short the output of selected transformers thereby allowing signals on the communications network to bypass the DTE and/or to be switched into the DTE. The DTE may also loop electrical signals from its output to its input.

13 Claims, 1 Drawing Figure

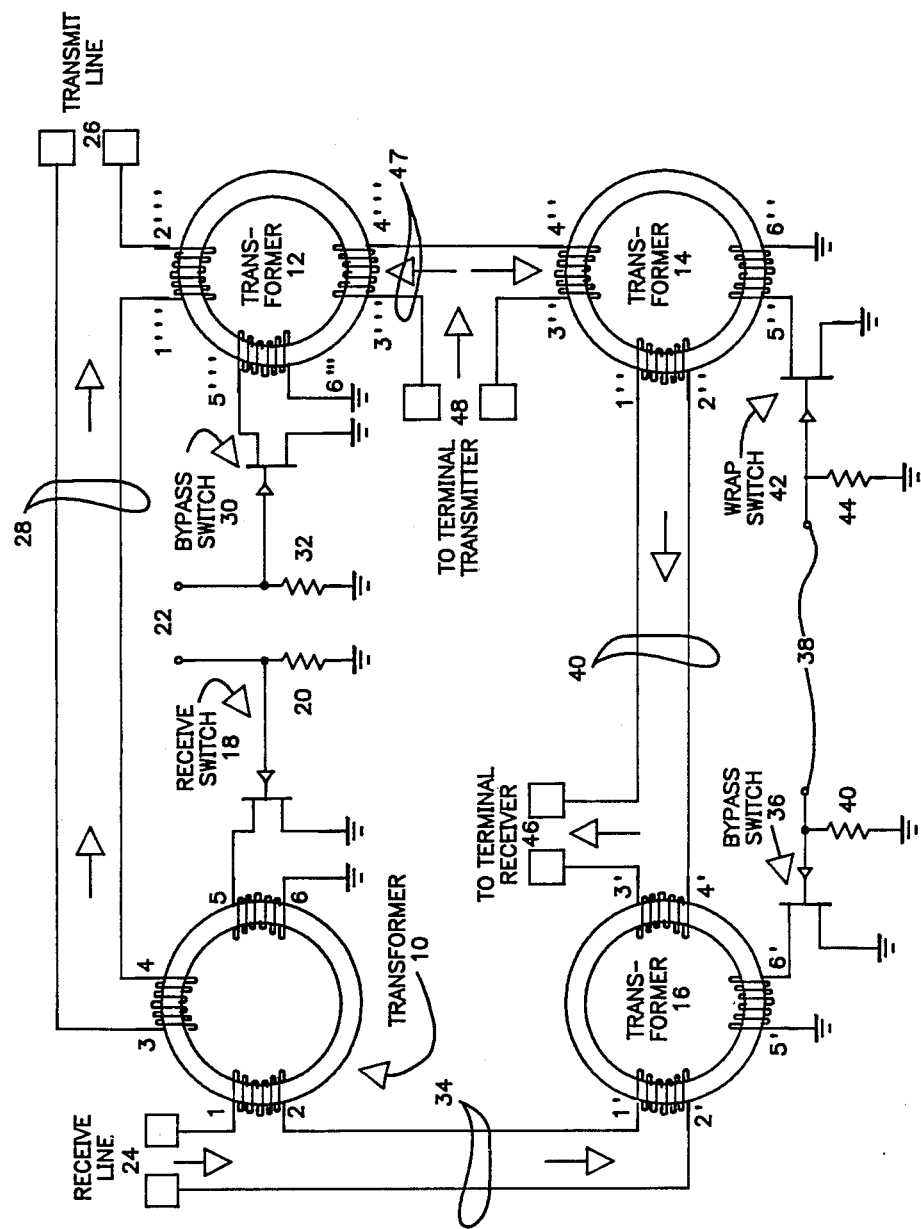

TRANSFORMER COUPLED, SOLID STATE COMMUNICATIONS LINE SWITCH

BACKGROUND OF THE INVENTION

1. Field of the Invention

The present invention relates to switching networks in general and more particularly to switching networks that connect data transmission systems with communications media.

2. Prior Art

In the past, numerous types of communications systems have been used to facilitate the exchange of data between machines. The ring or loop communications system is one of the well-known types. Although the loop system can be arranged in many different configurations, the basic configuration usually includes a transmission medium formed into a ring or closed loop. The transmission medium may be coaxial cables, copper wires, fiber optics, etc. The transmission medium is usually prewired into a building.

In order to gain access to the transmission medium, a plurality of devices called concentrators are provided. The concentrators are connected via relatively short lengths of transmission medium to respective wall plugs. By attaching a data terminal equipment to the wall plugs, a user is able to transfer information out of the ring to a recipient. An example of the prior art ring communications system is described in an article entitled. "IBM 8100 Information System, Communications and Loop Description," Form No. GA27-2883.

Each concentrator is provided with one or more switching devices. The function of the switching device is to insert an attached data terminal equipment into the ring and/or to remove the DTE from the ring. If a DTE is inserted, electrical signals are fed from the loop into the DTE. The DTE may use the signal or it may be retransmitted onto the transmission medium. Similarly, if the DTE is disconnected, it is bypassed by signals on the loop.

In the past electromechanical relays have been used as the chief device for switching the DTE into and/or out of the loop. Relays often work well for their intended purpose. However, the relays are plagued with several problems. Among the many problems are the following: unreliability, expensive to manufacture and very difficult to switch. The switching problem is augmented when it must be done remotely over long cable lengths. U.S. Pat. Nos. 4,417,242; 4,255,741; 4,435,704; 3,633,166 and 3,458,665 are examples of prior art devices in which some form of electromechanical relays aid in coupling or decoupling a station to a transmission medium.

SUMMARY OF THE INVENTION

It is therefore the main object of the present invention to provide a more efficient and reliable switching adapter than was heretofore possible.

The switching adapter utilizes magnetically coupled solid state devices to switch signals, on a transmission line, into the DTE or around (bypass) the DTE.

The adapter includes four signal coupling transformers (10, 16, 12, 14) and four solid state switches. Each switch is connected by appropriate winding to each of the transformers. The input side of the communications medium is connected serially to the input windings of two of the transformers (for example, transforms 10 and 16). The output windings of transformers 10 and 12 are connected to the communications medium at a point downstream from the input. The transmit section (called Terminal Transmitter) of the DTE is coupled serially to the input windings of transformers 12 and 14. The receiver section (called Terminal Receiver) of the DTE is coupled across respective windings on transformers 16 and 14. Two pairs of solid state switches are connected to two control terminals. When a proper control signal is applied to the respective terminals, the DTE is caused to operate in a receive mode, a wrap around mode, or a bypass mode. In the receive mode the terminal is inserted in the communications network and signals on the communications medium are fed into the terminal. Likewise, in the wraparound mode the terminal is not attached to the communications medium. However, the terminal may generate and transmit a signal on its transmitter and receive the same signal on its receiver. Finally, in the bypass mode the terminal is not attached to the communications medium. Signals on the medium are made to bypass the terminal.

BRIEF DESCRIPTION OF THE DRAWINGS

The sole FIGURE shows a switching arrangement according to the teachings of the present invention.

DETAILED DESCRIPTION OF THE PREFERRED EMBODIMENT

The circuit arrangement of the present invention can be used in any environment where electrical signals have to be switched. The circuit arrangement works well for switching electrical signals into a data terminal equipment or for bypassing said data terminal equipment and as such will be described in that environment. However, this should not be construed as a limitation on the scope of the present invention since it is the intent that the circuit can be modified and be used in an environment other than the one in which it is described. Examples of the communications system in which the present circuit arrangement can be used are given in U.S. Pat. No. 3,564,145 and patent application Ser. No. 463,470, filed on Feb. 3, 1983, by E. L. Tucker et al, entitled "Protocol for Determining Physical Order of Active Stations on a Token Ring," and assigned to the assignee of the present invention.

The operation and structure of these prior art communications system are well known in the prior art and details will not be given here. Suffice it to say that these prior art are incorporated herein by reference and can be referenced in the event that details of the communications system or network are needed.

The sole drawing gives a schematic of the circuit arrangement according to the teaching of the present invention. The sole drawing includes four switching transformers identified by numerals 10, 12, 14 and 16. Transformers 10 and 12 may be characterized as a first logical group or means which controls electrical signal on the communications medium. Likewise, transformers 14 and 16 may be characterized as a second logical group or means which controls electrical signals into and/or from the DTE. Three independent coils identified by numerals 1-2, 3-4, and 5-6 are wound on the magnetic structure of transformers 10. A receive switch means 18 is connected to coil 5-6. The input to receive switch means 18 is connected through resistive means 20 to ground and to terminal 22. As will be explained subsequently, receive switch means 18 is a solid state device and is, preferably, normally opened (NO)

switching device. The function of receive switch means 18 is to control the flux in transformer 10 so that when the switch is closed signals from the receive line at receive terminal 24 are transferred to the receiver (not shown) of the DTE that is connected to terminal 46.

Still referring to the sole drawing, the circuit arrangement of the present invention includes conductive means 28. The conductive means 28 interconnects coil 3-4 (on transformer 10) to coil 1‴-2‴ on transformer 12. Conductive means 28 also interconnects the transmit line to the receive line when the DTE is bypassed. In the preferred embodiment of this invention the conductive means 28 comprises a pair of conductive wires. Bypass switching means 30 is connected to coil 5‴-6‴ of transformer 12. The input of bypass switching means 30 is connected to terminal 22 and through resistive means 32 to ground. Bypass switching means 30 is a solid state device and is normally closed. As will be explained subsequently, when bypass switching means 30 is activated, signals on terminal 24 bypass the terminal and are fed out, onto the transmit line, at terminal 26.

Still referring to the sole drawing, conductive means 34 interconnects terminal 24 to the input side of the communications medium. The input side of the communication medium is referred to as the receive line. Conductive means 34 is tied to transformer 10 via coil 1-2 and is tied to transformer 16 via coil 1'-2'. In the preferred embodiment of this invention conductive means 34 is fabricated from a pair of conductive wires. The direction of signal travel on the wires is indicated by arrows. Bypass switch means 36 is coupled to transformer 16 via coil 5'-6'. The input of bypass switch means 36 is connected to terminal 38 and through resistive means 40 to ground. In the preferred embodiment of this invention, bypass switching means 36 is a solid state switching device. The switching device is normally closed. Conductive means 40 interconnects transformers 16 and 14 via coils 3'-4' and 1"-2", respectively. The conductive means 40 also interconnects the receiving terminal 46 to transformers 16 and 14. As stated previously, a data terminal equipment (not shown) is connected to terminal 46.

In the preferred embodiment of this invention conductive means 40 is fabricated from a pair of conducting wires. The direction of signal travel in the wires is shown by the arrows.

A wrap switch means 42 is interconnected by coil 5"-6" to transformer 14. As will be explained subsequently, the function of wrap switch means 42 enables a signal that is generated from an attached DTE to be wrapped back from the output of the DTE (terminal 48) to its input terminal 46. The input to wrap switch means 42 is tied to terminal 38. Resistive means 44 couples the wrap switch means 42 to ground. In the preferred embodiment of this invention, the wrap switch means 42 is a normally open switch and is fabricated from solid state devices. Conductive means 47 interconnects transformers 12 and 14 via coil 3"-4", coils 3‴-4‴, respectively. Terminal 48 is also connected to conductive means 47 and provides the interface which is interconnected to the transmitting portion of the attached DTE (not shown). In the preferred embodiment of this invention, conductive means 47 is fabricated from a pair of conducting transmission wires. The direction of signal travel in the wires is shown by the arrows.

As can be seen from the above description, the receive line is connected serially to the input windings of transformers 10 and 16. The transmit line is connected serially to the output windings of transformers 10 and 12. The transmission line drivers of the attached DTE (not shown) are connected serially to the input windings of transformers 12 and 14. Similarly, the input to the line receivers of the attached DTE (not shown) is connected across the output windings of transformers 16 and 14.

As was stated above, the function of the switching means 18, 30, 36 and 42 is to control the flux in their respective transfomers. By controlling the flux a DTE is made to operate in a "by-pass" mode, a "wrap" mode or a "receive" mode. In the by-pass mode, signals on the communications medium are switched around the DTE. Similarly, in the receive mode signals on the communications medium are accepted by the DTE. In the wrap mode, signals from the output of the DTE are fed back to its input. Preferably, these switching means are fabricated from field effect transistors (FETs). For proper operation FET switches 30 and 36 are normally closed switch and are fabricated from N-channel depletion mode devices. Likewise, FET switches 18 and 42 are normally open and are fabricated from N-channel enhancement mode devices. Of course, it is well within the skill of one skilled in the art to provide other types of solid state devices which will provide the appropriate normally closed or normally open switches for the present invention.

OPERATION

During those times that the data terminal equipment is operating in the "BY-PASS" mode, FET switches 36 and 30 are conducting or are in an "ON" state. In this condition, an effective "short" is reflected across windings 1'-2' and 1‴-2‴ of transformers 16 and 12, respectively. The input signal voltage on the transmission line is impressed entirely across windings 1-2 of transformer 10. Now, if the turn's ratios are unity for all windings, an identical voltage is impressed across windings 3-4 of transformer 10. With an effective short being reflected across windings 1‴-2‴ of transformer 12, the voltage amplitude on the transmit line will be identical to that on the receive line.

When it is desired to place the data terminal equipment in the receive mode, FET switches 18 and 42 are turned on, and switches 30 and 36 are turned off. In this condition a short is reflected across windings 1-2 of transformer 10 and the receive signal voltage appears across windings 1'-2' of transformer 16. With the short reflected across windings 1"-2" of transformer 14, the receive line signal voltage is coupled via windings 3'-4' of transformer 16 to the input of the data terminal equipment receiver circuitry (not shown).

During data transmission, with a short reflected across windings 3"-4" of transformer 14 the transmit signal voltage appears in its entirety across winding 3‴-4‴ of transformer 12. With a short reflected across winding 3-4 of transformer 10, the transmitting of signal voltages is coupled via winding 1‴-2‴ of transformer 12 to the transmit line. In order to place the short on transformer 10 and no short on transformer 12 an appropriate voltage signal is placed on terminal 22.

During those intervals that the communications terminal is in "bypass" mode, the FET switching means 30 and 36 are on. If one elects to test the terminal by employing a wrap operation, FET switching means 42 is held off. This allows the transmit signal voltage to be impressed across windings 3"-4" of transformer 14 since a short is reflected across winding 3-4 of transformer 12. This signal is then coupled to the receiver input circuitry via windings 1"-2" of transformers 14.

While the invention has been particularly shown and described with reference to the preferred embodiments thereof, it will be understood by those skilled in the art that various changes in form and details may be made therein without departing from the spirit and scope of the invention.

Having thus described my invention, what I claim as new and desire to secure as Letters Patent is as follows:

1. In a communications network having a transmission medium operable for transmitting electrical signals provided by one or more DTEs connected to said medium a switching arrangement operable for inserting and/or de-inserting the DTE from the transmission medium comprising:
   a first means operable for controlling the flow of electrical signals on the transmission medium;
   a second means operable for controlling the flow of electrical signals into and/or from said DTE;
   a first conductive means operable for coupling the first and second means to an input side of the transmission medium;
   a second conductive means operable for coupling the first means to an output side of said transmission medium;
   a third conductive means operable for coupling the second means to the DTE;
   a fourth conductive means operable for coupling the second means to the first means; and
   control means coupled to the first and second means and operable for selective disabling said first and second means so that electrical signals from a DTE are being transmitted onto the transmission medium or being wrapped from the output of said DTE to its input or signals on said transmission medium are being transmitted into the DTE or are being made to bypass said DTE.

2. The switching arrangement of claim 1 wherein the first means includes a first pair of transformers with each transformer carrying a plurality of control windings thereon.

3. The switching arrangement of claim 2 wherein the second means includes a second pair of transformers with each transformer carrying a plurality of control windings thereon.

4. The switching arrangement of claim 3 wherein each conductive means includes a length of conductive mediums connected at opposite ends to one of the control windings on a selected pair of transformers.

5. The switching arrangement of claim 1 wherein the control means includes a plurality of switching devices with each pair of the switching devices being connected to a common terminal and and operable for receiving enabling signal for activating said switching devices.

6. The switching arrangement of claim 5 wherein the switching devices includes solid state switches.

7. The switching arrangement of claim 6 wherein the solid state switches include FETs.

8. A circuit arrangement for attaching DTEs into a communications network comprising:
   a first coupling means carrying a plurality of coils thereon;
   a first flux control means connected to a first coil on the first coupling means;
   a second coupling means having a plurality of coils thereon;
   a length of conductive medium operable for interconnecting to the communication network and for interconnecting to a second coil on the first coupling means and a second coil on said second coupling means;
   a second flux control means being connected to a first coil on the second coupling means;
   a third coupling means having a plurality of windings thereon;
   a length of conductive medium operable for interconnecting the transmission medium to a third coil being located on the first coupling means and a second coil on the third coupling means;
   a third flux control means being connected to a first coil on the third coupling means;
   a fourth coupling means having a plurality of windings thereon;
   a length of conductive medium operable for interconnecting a receiving terminal of said DTE to a third coil on the second coupling means and a second coil on the fourth coupling means;
   a fourth flux control means being connected to the fourth coupling means; and
   a length of conductive medium operable for interconnecting a transmit terminal of said DTE to the fourth and third coupling means.

9. The circuit arrangement of claim 8 further including means for interconnecting the first and second flux control means to a common terminal.

10. The circuit arrangement of claim 8 further including means for interconnecting the third and fourth flux control means to a common terminal.

11. The circuit arrangement of claim 9 or 10 further including a control signal for enabling the common terminals.

12. The circuit arrangement of claim 11 wherein the flux control means includes solid state switching devices.

13. The circuit arrangement of claim 12 wherein the solid state devices include FETs.

* * * * *